(12) United States Patent
Lau

(10) Patent No.: US 9,082,175 B2
(45) Date of Patent: Jul. 14, 2015

(54) METHOD FOR RETRIEVING ASSOCIATED INFORMATION USING AN IMAGE

(75) Inventor: Man Yuen Lau, Hong Kong (CN)

(73) Assignee: Easy Printing Network Limited, Kowloon, Hong Kong (CN)

(*) Notice: Subject to any disclaimer, the term of this patent is extended or adjusted under 35 U.S.C. 154(b) by 32 days.

(21) Appl. No.: 14/237,594

(22) PCT Filed: Oct. 25, 2011

(86) PCT No.: PCT/CN2011/081239
§ 371 (c)(1),
(2), (4) Date: Feb. 7, 2014

(87) PCT Pub. No.: WO2013/020325
PCT Pub. Date: Feb. 14, 2013

(65) Prior Publication Data
US 2014/0169618 A1    Jun. 19, 2014

(30) Foreign Application Priority Data
Aug. 10, 2011 (HK) ................. 11108375.5

(51) Int. Cl.
G06K 9/00 (2006.01)
H04N 1/40 (2006.01)
G06T 1/00 (2006.01)

(52) U.S. Cl.
CPC ............... *G06T 1/0021* (2013.01); *G06T 1/005* (2013.01); *G06T 2201/0065* (2013.01)

(58) Field of Classification Search
None
See application file for complete search history.

(56) References Cited

U.S. PATENT DOCUMENTS

| | | | | |
|---|---|---|---|---|
| 5,850,481 A | * | 12/1998 | Rhoads | 382/232 |
| 8,509,474 B1 | * | 8/2013 | Reed et al. | 382/100 |
| 2008/0166013 A1 | * | 7/2008 | Ishikawa et al. | 382/100 |
| 2008/0205697 A1 | * | 8/2008 | Sakai et al. | 382/100 |
| 2009/0201556 A1 | * | 8/2009 | Hara | 358/3.28 |
| 2009/0262390 A1 | * | 10/2009 | Tanaka | 358/1.15 |
| 2010/0008600 A1 | * | 1/2010 | Kamijo et al. | 382/313 |

OTHER PUBLICATIONS

Cheddad, Abbas, et al. "Digital image steganography: Survey and analysis of current methods." Signal processing 90.3 (2010): 727-752.*

* cited by examiner

*Primary Examiner* — Li Liu
(74) *Attorney, Agent, or Firm* — Nixon Peabody LLP; Jeffrey L. Costellia (57) ABSTRACT

A method for retrieving associated information using an image (10), comprising: locating a spatial pattern (13) in an image (10) captured by an image capture device, the spatial pattern (13) providing an instruction (12, 14, 15) or a specification for further processing to occur; wherein if a first predetermined spatial pattern is located in the image (10), a steganographic signal (12) is decoded from the image (10) for extracting a profile configuration of the image (10) in order to retrieve the associated information; and if a second predetermined spatial pattern is located in the image (10), image features of the image are recognized (15) in order to retrieve the associated information.

20 Claims, 8 Drawing Sheets

METHOD FOR RETRIEVING ASSOCIATED INFORMATION USING AN IMAGE

TECHNICAL FIELD

The invention concerns a method for retrieving associated information using an image.

BACKGROUND OF THE INVENTION

Steganography is a technique to embed message into media content in a human imperceptible way. A common way to add steganographic signal to image is to add it into the frequency domain. The spatially described image data is transformed to frequency representation using for example Fourier Transform. As human vision is not sensitive to changes in higher frequency image features, this method shows high imperceptibility. Besides this, the yellow-blue color channel can be used to embed message, as human vision is not sensitive to change in this channel.

Image recognition is a computer vision technology to extract optical information from an image to make decision. Some common algorithms exist to extract image features such as Scale-Invariant Feature Transform (SIFT) and Speeded-Up Robust Feature (SURF). These algorithms create feature descriptors from the input image frame. Using these descriptors, a system can perform matching process to check the relevance of the product to the product database. Another common application of computer vision technology is Optical Character Recognition (OCR). By matching objects in the image frame with font templates, a system can extract characters as well as entire text strings. This further enhances the efficiency of database lookup for the matching product entries.

The information that can be stored within a hidden image is limited, for example, 20 bit which is 1 million variations. Therefore it is desirable to increase the amount of information and variations that can be stored in a hidden image and maintain performance of a system for retrieving associated information using an image.

SUMMARY OF THE INVENTION

In a first preferred aspect, there is provided a method for retrieving associated information using an image, comprising:

locating a spatial pattern in an image captured by an image capture device, the spatial pattern providing an instruction or a specification for further processing to occur;

wherein if a first predetermined spatial pattern is located in the image, a steganographic signal is decoded from the image for extracting a profile configuration in order to retrieve the associated information; and if a second predetermined spatial pattern is located in the image, image features of the image are recognised in order to retrieve the associated information.

The method may further comprise an initial step of checking a flag to determine whether a steganographic signal is to be decoded from the image prior to locating the spatial pattern in the image.

If no spatial pattern is located in the image, a steganographic signal may be decoded from the image for extracting a profile configuration in order to retrieve the associated information.

The predetermined spatial pattern may be single or apart, black or white, or in colour.

If a third predetermined spatial pattern is located in the image, at least a portion of the image may be communicated to an analysis server with at least a portion of routine configuration parameters The routine configuration parameters may include server information address, port, and protocol.

The associated information may be an Internet link or information content.

The spatial pattern may be any one from the group consisting of: pattern, Machine Readable Code, colour and character.

The image features may be recognised using any one from the group consisting of: Optical Character Recognition (OCR) algorithms, Machine Readable Code and Feature Transform algorithms.

The extracted profile configuration may cause a profile specific operation to be performed by accessing a profile database to retrieve the associated information for the extracted profile configuration.

The profile specific operation may contain a profile indicator and parameters for the profile specific operation to generate a content indicator or actual content.

The profile specific operation may be any one from the group consisting of: image recognition profile, and online processing profile.

The routine configuration parameters may further include instructions on which analysis processes to be performed, and whether the analysis processes are performed in series or in parallel such that succeeding operations use the result of preceding operations.

In a second aspect, there is provided a system for retrieving associated information using an image, comprising:

a pattern location module to locate a spatial pattern in an image captured by an image capture device, the spatial pattern providing an instruction or a specification for further processing to occur;

a steganographic signal decoding module to decode a steganographic signal from the image for extracting a profile configuration in order to retrieve the associated information if a first predetermined spatial pattern is located in the image; and an image feature recognition module to recognise image features of the image in order to retrieve the associated information if a second predetermined spatial pattern is located in the image.

The predetermined spatial pattern may be single or apart, black or white, or in colour.

The system may further comprise a communications module to communicate at least a portion of the image to an analysis server with at least a portion of routine configuration parameters, if a third predetermined spatial pattern is located in the image.

The routine configuration parameters may include server information address of the analysis server, port of the analysis server, and protocol to communicate with the analysis server.

The associated information may be an Internet link or information content.

The spatial pattern may be any one from the group consisting of: pattern, Machine Readable Code, colour and character.

The image features may be recognised using any one from the group consisting of: Optical Character Recognition (OCR) algorithms Machine Readable Code and Feature Transform algorithms.

The extracted profile configuration may cause a profile specific operation to be performed by accessing a profile database to retrieve the associated information for the extracted profile configuration.

The profile specific operation may contain a profile indicator and parameters for the profile specific operation to generate a content indicator or actual content.

The profile specific operation may be any one from the group consisting of: image recognition profile, and online processing profile.

The routine configuration parameters may further include instructions on which analysis processes to be performed, and whether the analysis processes are performed in series or in parallel such that succeeding operations use the result of preceding operations.

Several image processing and computer vision technologies are used in the present invention. Data bits are added to image content to deliver some information.

The product features such as shape and color is extracted as a key to retrieve result contents.

A hybrid system for extracting embedded or linked information in an image is provided. The system uses multiple routines to analyse image features using different techniques. These routines are either assigned by the application or selected by detecting spatial patterns. The Image Recognition Routine analyses image features such as shapes, characters and machine readable codes. The Online Processing Routine uploads the image to remote server for analysis. The Steganographic routine decodes steganographic signal added to the image. This returns a Profile Configuration which leads to further analysis process to retrieve extra information. The outputs of these routines can be used to retrieve and/or display informative contents.

There are additional steps performed after steganographic decoding such as image recognition and OCR. These additional steps significantly increase the product variations. For example, the key "412000" out of one million variations is first obtained by decoding the hidden image. Then among 10,000 series of products with key "412000", an additional process (Image Recognition, OCR) is used to determine if this product belongs to "Series 9899" and serial number "412000". Therefore, instead of having 1,000,000 variations only, there are now 10,000,000,000 variations. These variations can lead towards infinite.

Also, some non-printed products cannot use a hidden image, therefore image recognition, and OCR have to be used.

Guided by steganographic data, the additional application can be more efficient with more information. A Spatial Pattern Lookup operation can easily distinguish whether the image has associated information to be retrieved or not. The Spatial Pattern Lookup operation can significantly enhance the speed of detection. The present invention uses the steganographic data as a profile configuration instead.

BRIEF DESCRIPTION OF THE DRAWINGS

An example of the invention will now be described with reference to the accompanying drawings, in which.

DETAILED DESCRIPTION OF THE DRAWINGS

Figure 1:
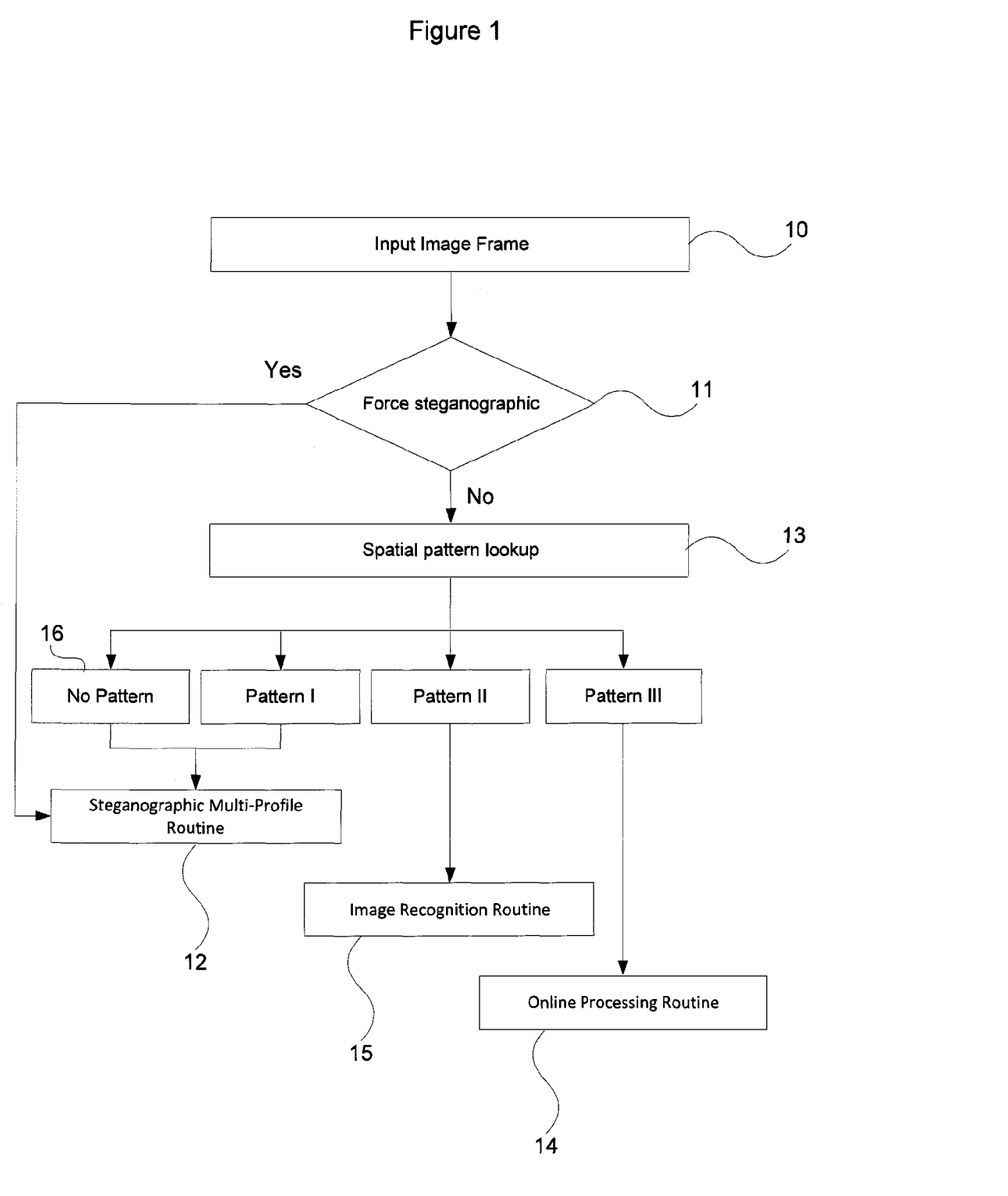
FIG. 1 is a process flow diagram depicting routine selection in accordance with an embodiment of the present invention.

FIG. 1 and the following discussion are intended to provide a brief, general description of a suitable computing environment in which the present invention may be implemented. Although not required, the invention will be described in the general context of computer-executable instructions, such as program modules, being executed by a computer such as a personal computer, laptop computer, notebook computer, tablet computer, PDA and the like. Generally, program modules include routines, programs, characters, components, data structures, that perform particular tasks or implement particular abstract data types. As those skilled in the art will appreciate, the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 8:
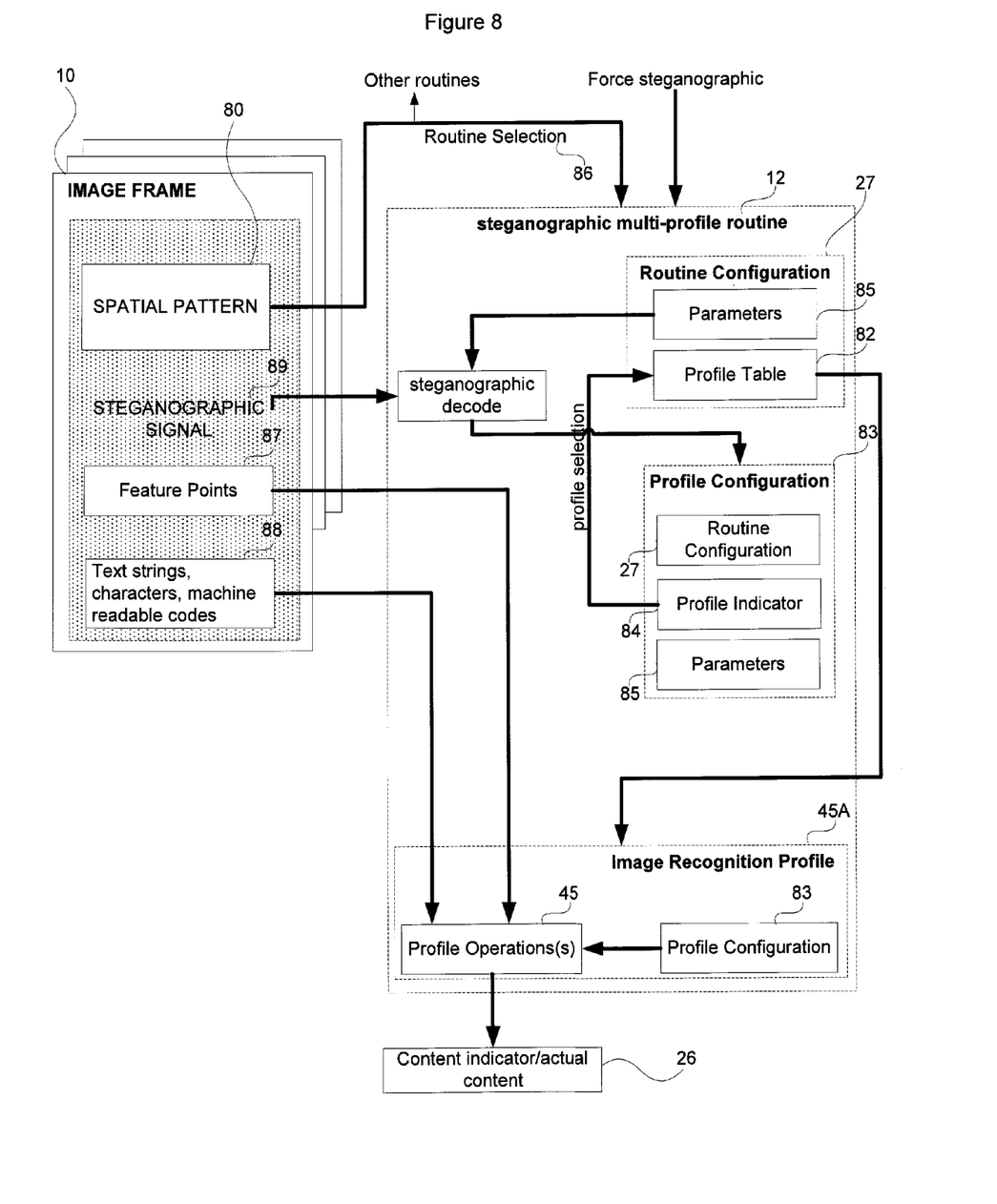
FIG. 8 is a block diagram depicting a captured Image Frame and the various data that is extracted and processed from the captured Image Frame.

Referring to FIGS. 1 and 8, the first step of the system is to select a Routine by checking a "Force Steganographic" flag 11. When a captured Image Frame 10 is inputted into the system, the "Force Steganographic" flag is checked 11. If the flag is set to Steganographic Routine, the steganographic multi-profile routine 12 is executed. Otherwise, a Spatial Pattern Lookup operation 13 is performed to determine which routine is to be executed. A Spatial Pattern 80 is contained in a captured Image Frame 10. The Spatial Pattern 80 contains a Routine ID used to select a Routine 12, 14, 15 to execute. The Spatial Pattern 80 provides an instruction (which routine is to be executed) or a specification for further processing to occur (how to perform the Routine, for example, two modes of the Online Processing Routine 14 using two different analysis servers 31).

The Spatial Pattern Lookup process 13 analyzes the captured Image Frame 10 to look for a Spatial Pattern 80. The Spatial Pattern 80 is in the form of a Simple Marker, Machine Readable Code, Characters, Colors, or any combination of them. When different pre-defined spatial patterns 80 are detected, a Routine Configuration 27 will be derived and a different Routine 12, 14, 15 will be executed. The Routines include the Steganographic Routine 12, the Image Recognition Routine 15, the Online Processing Routine 14. A default Routine, for example, the Steganographic Routine 12, can be set to execute when no Spatial Pattern 80 is detected 16. The Routine Configuration 27 is defined in a current application and is associated with a current Routine 12, 14, 15. The Routine Configuration 27 is not extracted from the Spatial Pattern 80. The Routine Configuration 27 is used for operations executed by a Routine 12, 14, 15, in Profile Selection and Profile Operations. The Routine Configuration 27 is also included in a Profile Configuration 83 and in a content indicator/actual content 26.

Figure 2:
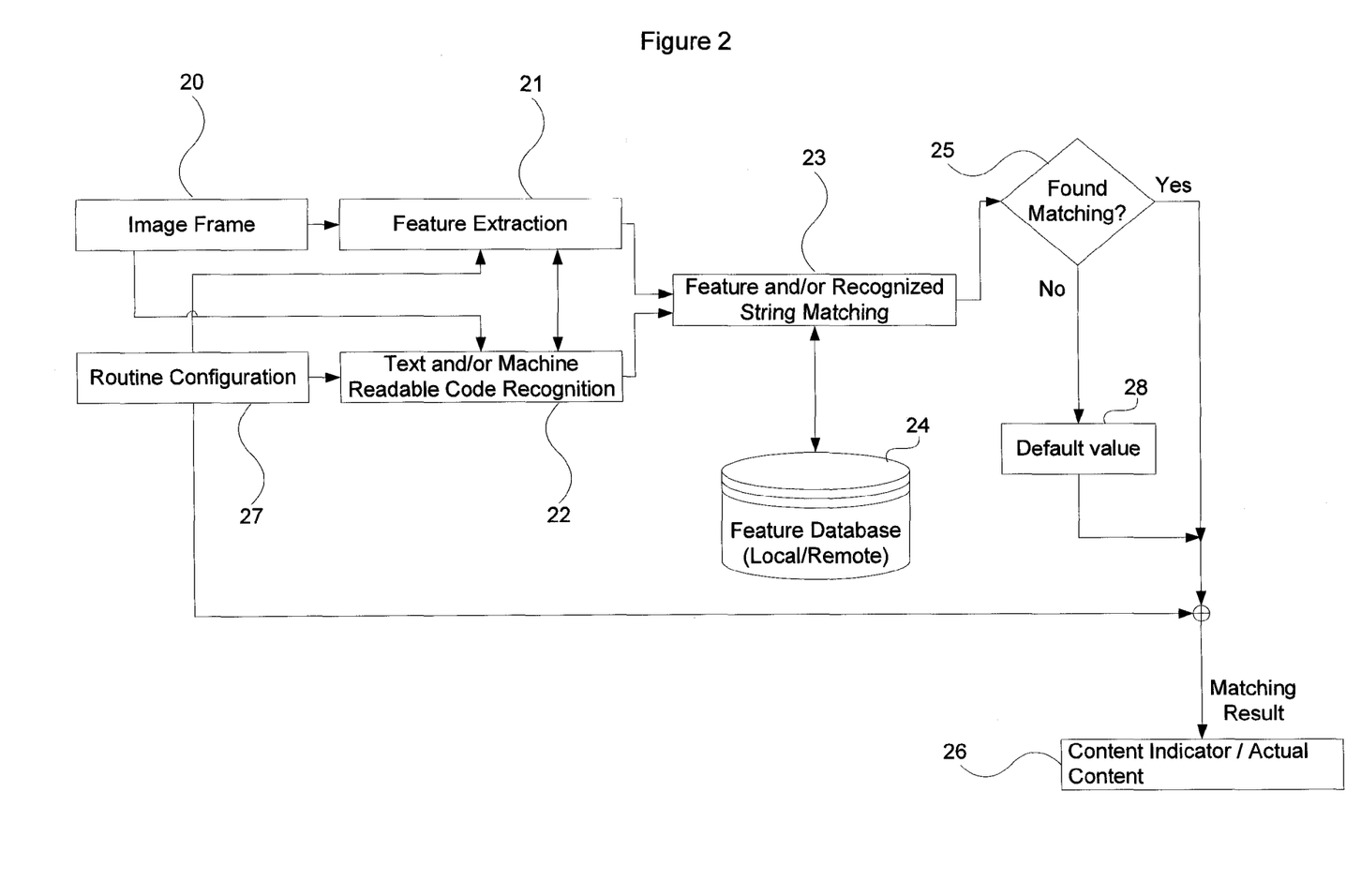
FIG. 2 is a process flow diagram depicting the image recognition routine in accordance with an embodiment of the present invention.

Referring to FIG. 2, the image recognition routine 15 targets on extracting information solely from the image features. It is useful for image products that are not suitable to embed information. For example, when a product is manufactured with un-modifiable printing process, it may not be possible to embed an optical signal or information into the product.

When a captured Image Frame 20 is passed into the image recognition routine 15, several analysis operations are performed. For example, feature points extraction 21 and text recognition 22 according to the predefined Routine Configuration 27. The Routine Configuration 27 contains parameters to tell which analysis processes should be performed, as well as whether they are performed in series or in parallel so that succeeding operations may utilize result of preceding operations. For example, the text recognition result may be examined to decide whether feature extraction 21 should be performed. It is beneficial that some computation expensive operations can be skipped if sufficient data is retrieved already.

In the Text and/or Machine Readable Code Recognition operation 22, text strings, characters 88 are detected and recognized using conventional Optical Character Recognition algorithms. Predefined Machine Readable Codes 88 are detected and recognized by their corresponding decoding algorithms. The recognized string is matched 23 with records in the feature database 24. If there is a match, the matching result 25 may be passed on to next step 26 directly, or may be used to optimize the feature extraction operation. If there is no match, a default value 28 is returned. The default value 28 means an application defined result used when no matching records are found.

In the Feature Extraction operation 21, feature points 87 are transformed into descriptors. This can be done by applying common Feature Transform algorithms, such as Scale-Invariant Feature Transform (SIFT), Speeded-Up Robust Feature (SURF), as well as other algorithms. The parameters and behavior of these algorithms may be altered according to result of previous operation to achieve better performance or efficiency. The descriptor is then compared with a set of entries in the feature database 24. The entry set may be filtered according to the result of preceding processes. Finally the matching result 26 is passed on to next step. Other analysis operation may be chosen for each particular application, for example shape and color. After all analysis operation, the result is further processed to retrieve result contents for display and/or other use in the application.

Figure 3:
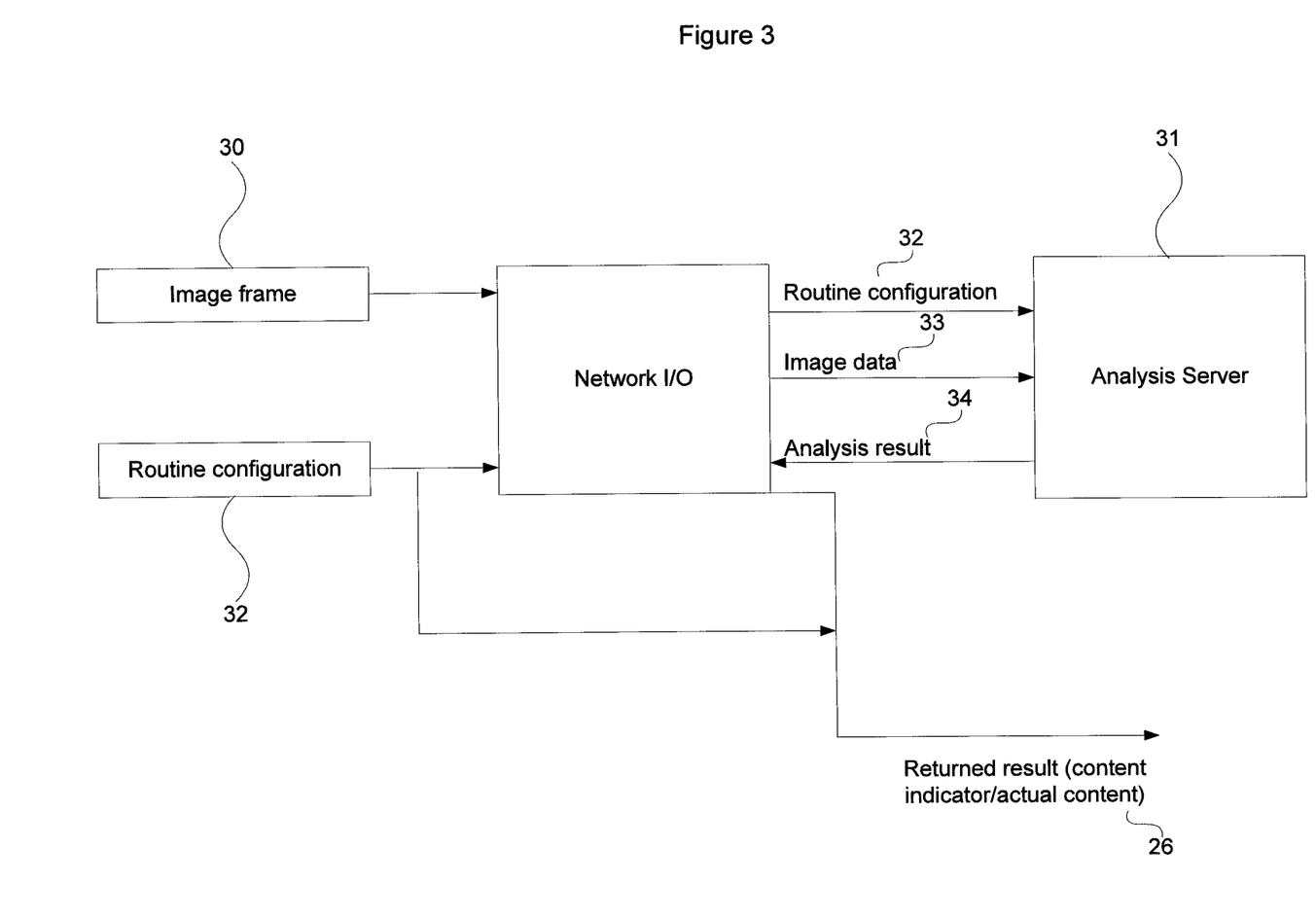
FIG. 3 is a process flow diagram depicting online processing routine in accordance with an embodiment of the present invention.

Referring to FIG. 3, in the Online Processing Routine 14, the entire Image Frame 30 or part of the Image Frame 30 is uploaded to an analysis server 31 together with the all or part of the Routine Configuration parameters 32. The Routine Configuration parameters 32 contains the server information address of the analysis server 31, port of the analysis server 31, protocol to communicate with the analysis server 31, resolution, colour, etc. In addition, detailed operation parameters are included in the Routine Configuration 27. The detailed operation parameters include possible content of the Routine Configuration 27 and the Profile Configuration 83. The format and content of these parameters are defined according to different implementation and different routines. For example, the Routine Configuration of the Online Processing Routine 14 contains operation parameters such as server address guiding the Online Processing Routine 14 to contact the corresponding server.

With different Routine Configurations, multiple instances of the Online Processing Routine 14 may be implemented in the system, mapping to different Spatial Patterns. After receiving these data, the analysis server 31 will process the image data 33 according to corresponding parameters in the routine configuration 32. For example, an Online Processing Routine Configuration 32 may guide the analysis server 31 to do Steganographic Decoding, Image Recognition, Feature Extraction, Text Recognition, Machine Readable Code Recognition or any combination of them. With higher computation power, the server 31 can perform more complex algorithm than the client devices of users. This routine 14 enables extension of the processing power and efficiency of the system. When the process is finished, a result 34 will be returned from the server 31. The result is in the form of a content indicator or the actual content 26. If a content indicator is received, a content retrieval operation (see FIG. 7) is required to retrieve the actual content as described later. The actual content is then displayed and/or used in further processes on the application.

Figure 4:
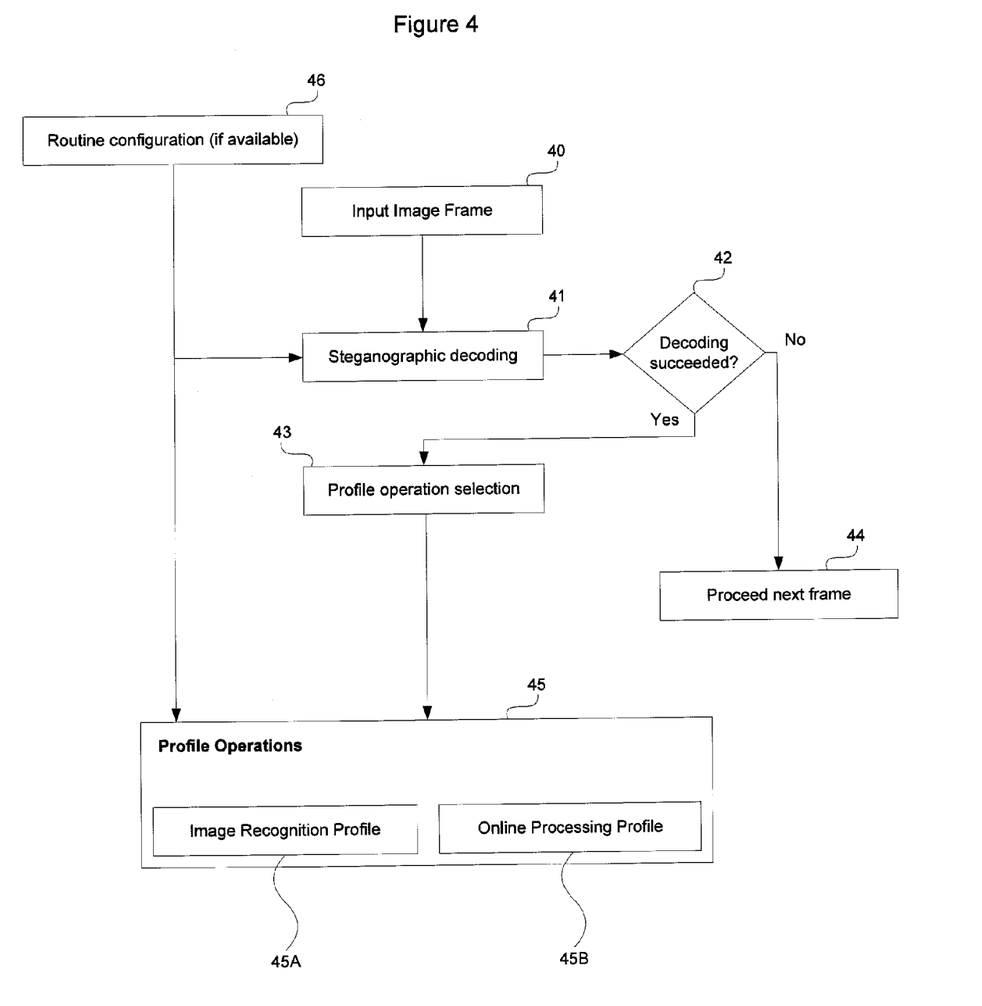
FIG. 4 is a process flow diagram depicting steganographic and Multi-Profile Routine in accordance with an embodiment of the present invention.

Referring to FIG. 4, in the Steganographic Multi-Profile Routine 12, the Routine Configuration 46 is fixed on each single instance of a Steganographic Multi-Profile Routine 12. This implies the possibility of multiple instances of the Steganographic Multi-Profile Routine 12 being executed according to different implementations. The Routine Configuration 46 contains a description of the steganographic decoding process, the profile selection process, and possibly the profile operations if a Profile Configuration 83 solely is not comprehensive enough.

A Profile Configuration 83 is extracted from an Image Frame 40 captured of a product in which an artificial steganographic signal 89 is embedded. The Profile Configuration 83 is partly extracted from the decoded steganographic signal 89. This process requires access to the printing process of the product so that the printed image can be altered. The Profile Configuration 83 is partly defined in the current application and is associated with the current Routine 12, 14, 15 and current Profile 45A, 45B. The Profile Configuration 83 is used in Profile Operations 45 and is included in the content indicator/actual content 26. According to the Profile Configuration 83, different analysis operations (profile operations) can be performed on the captured Image Frame 40 to retrieve the result of this routine. When a captured Image Frame 40 is received, it is analyzed by the steganographic signal detection operation using an electronic memory device. This operation may perform frequency transform according to the embedding method of the signal for a particular application. If the steganographic signal is detected, it is decoded 41 from the Image Frame 40 to obtain a data bit sequence which is used as the Profile Configuration 83 to select 43 a Profile Operation 45. If the decoding is not successful 42, then the next captured Image Frame 44 is input. Having retrieved the Profile Configuration 83, the system continues to apply Profile Operations 45 according to the Profile Configuration 83 that is extracted from the steganographic signal. These Profile Operations 45 can be viewed as sub-routines which allow more variations than normal routines. That is, the Profile Configuration 83 contains the Profile Indicator 84 as well as some parameters 85 for the Profile Operations 45. Some routines can be modified to be used as Profile Operations 45.

A Profile Table 82 is referenced by the Routine Selection 86 process of the Steganographic Multi-Profile Routine 12. The program fetches the Profile Configuration 83 and jumps to the address pointed by the Operation Code Pointer by looking up the Profile Indicator 84 in the Profile Table 82.

The Profile Table 82 is a list storing the available profiles of the current Routine of the current Application, as well as their corresponding profile configuration and operations. For example, a Profile Table 82 may contain entries like:

Profile 1—Online Processing Profile, <Profile Configuration>, <Operation Code Pointer>

Profile 2—Image Processing Profile, <Profile Configuration>, <Operation Code Pointer>

The <Operation Code Pointer> represents a Pointer the compiled program code of the Profile Operations. The term Pointer conforms to Pointers in C++ programming language.

For example, the Image Recognition Routine 15 and Online Processing Routine 14 can be modified to receive a Profile Configuration which becomes the Image Recognition Profile 45A and Online Processing Profile 45B, respectively. The Image Recognition Profile 45A and Online Processing Profile 45B are Profile Operations 45. The result of these Profile Operations 45 is in the form of a content indicator and/or the actual content 26. If a content indicator is received, a content retrieval operation (see FIG. 7) is required to retrieve the actual content as described later in this section. The actual content is then displayed or used in further processes on the application.

Figure 5:
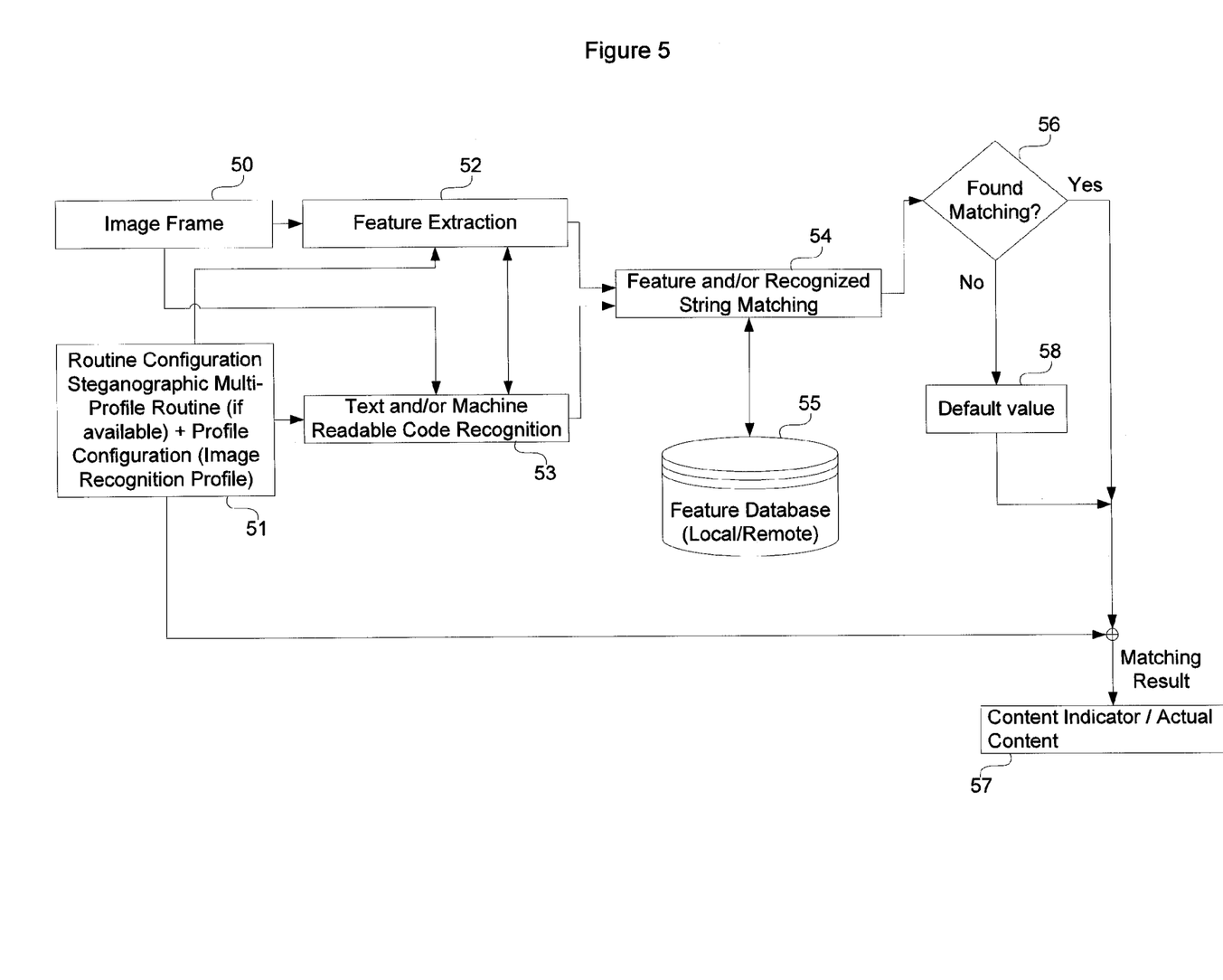
FIG. 5 is a process flow diagram depicting Image Recognition as a Profile Specific Operation.

Referring to FIG. 5, in the Image Recognition Profile Operation 45A, information from the original image features is extracted. When a captured Image Frame 50 is passed into the Image Recognition Profile Operation 45A, several analysis operations are performed according to the Routine Configuration and Profile Configuration parameters 51 from the preceding operations of the Steganographic Multi-Profile Routine 12. The above parameters contain setting to enable/disable certain recognition process, as well as control their behavior. For example, Feature Extraction 52 and Text and/or Machine Readable Code Recognition 53 are enabled. These analysis processes can be performed in parallel or in series where succeeding operations may utilize preceding results. For example, result from the Text and/or Machine Readable Code Recognition 53 may be examined to decide whether Feature Extraction 52 should be performed. It is beneficial that some computation expensive operations can be skipped if sufficient data is already retrieved.

In the Text and/or Machine Readable Code Recognition operation 53, text strings, characters 88 are detected and recognized using conventional Optical Character Recognition algorithms. Predefined Machine Readable Codes 88 are detected and recognized by their corresponding decoding algorithms, whereas the recognized string is matched 54 with records in the feature database 55. The recognized string is matched 56 with records in the feature database 55. If there is a match, the matching result 56 may be passed on to next step 57 directly, or may be used to optimize the feature extraction operation. If there is no match, a default value 58 is returned. The default value 58 means an application defined result used when no matching records are found.

In the Feature Extraction operation 52, feature points 87 are transformed into descriptors. This can be done by applying common Feature Transform algorithms, such as Scale-Invariant Feature Transform (SIFT), Speeded-Up Robust Feature (SURF), as well as other new algorithms. The parameters and behavior of these algorithms may be altered according to result of previous operation to achieve better performance or efficiency. The descriptor is then compared 54 with a set of entries in the feature database 55. The entry set may be filtered according to the result of preceding processes. Finally the matching result 56 is passed on to next step. Other analysis operation may be chosen for each particular application, for example, shape and color. After all analysis operation, the result is further processed to retrieve result contents 57 for display and/or other use in the application.

Figure 6:
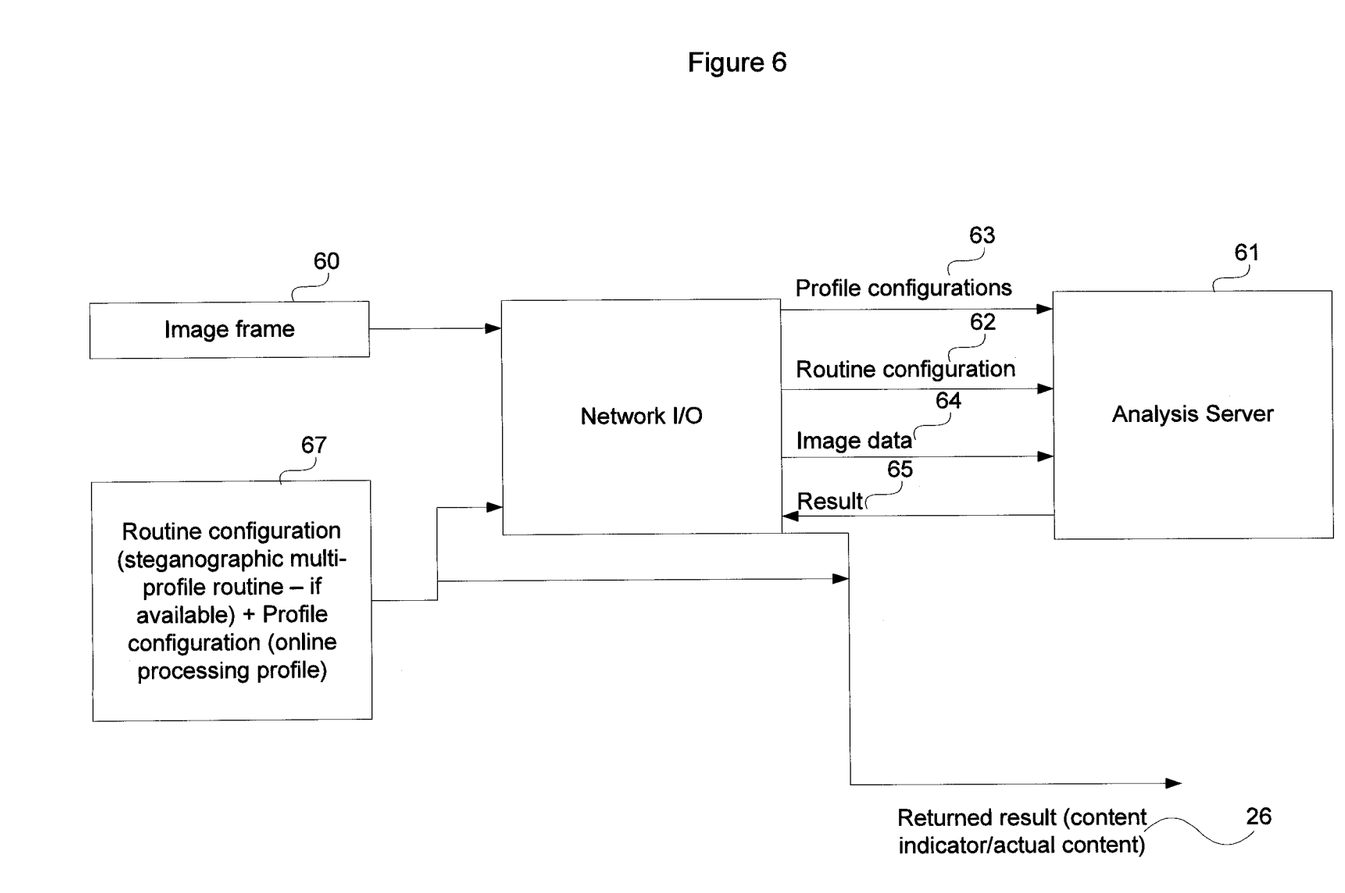
FIG. 6 is a process flow diagram depicting Online Processing as a Profile Specific Operation.

Referring to FIG. 6, in the Online Processing Profile Operation 45B, the Routine Configuration 67 is fixed on each single instance of a Online Processing Profile Operation 45B. This implies the possibility of multiple instances of the Online Processing Profile Operation 45B being executed according to different implementations. The Routine Configuration 67 contains a description of the online processing profile operation, the profile selection process, and possibly the Profile Operations 45 if a Profile Configuration 83 solely is not comprehensive enough.

The entire Image Frame 60 or part of it is uploaded to an analysis server 61 together with all or part of the Routine Configuration parameters 62 of the Steganographic Multi-Profile Routine 12 and the Profile Configuration parameters 63 decoded. The above parameters contain the server information address, port, protocol etc. In addition, the detailed operation parameters are included in the parameters. After receiving these data, the analysis server 61 will process the image data 64 according to corresponding parameters in the parameters. For example, the parameters may guide the analysis server 61 to do Steganographic Decoding, Image Recognition, Feature Extraction, Text Recognition, Machine Readable Code Recognition or any combination of them. With higher computation power, the server 61 can perform more complex algorithms than the customer's client devices. Therefore this profile enables extension of the processing power and efficiency of the system. When the process is finished, a result 65 will be returned from the server 61. The result is in the form of a content indicator or the actual content 26. If a content indicator is received, a content retrieval operation (see FIG. 7) is required to retrieve the actual content described later. The actual content is then displayed and/or used in further processes on the application.

Figure 7:
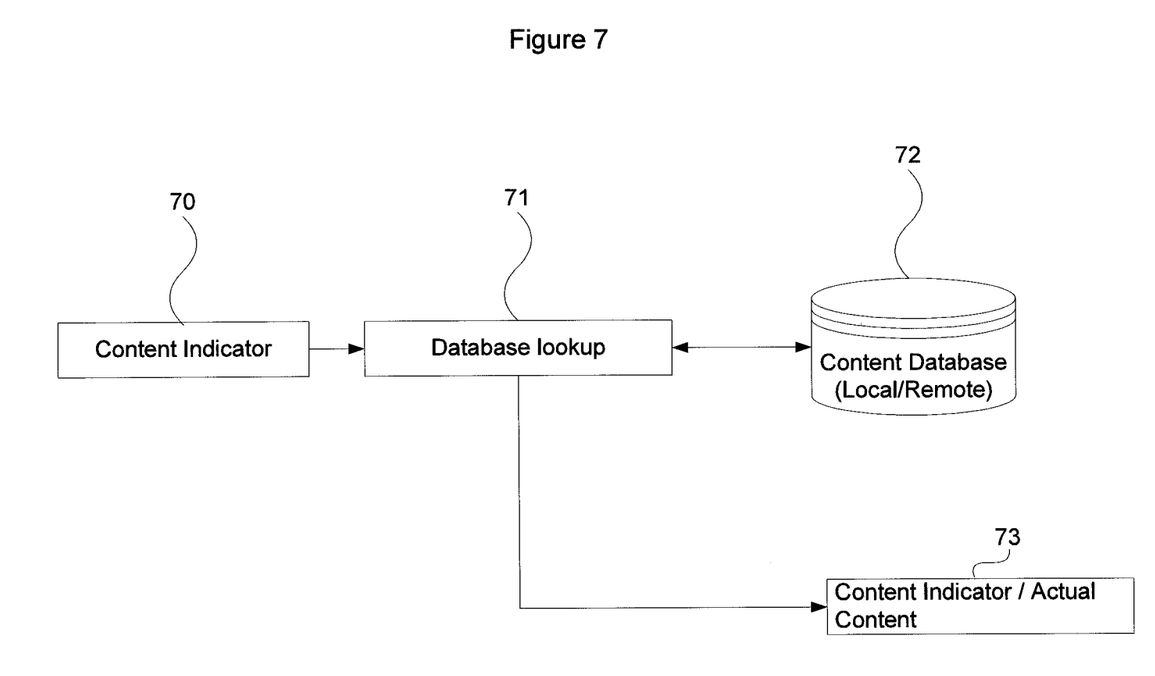
FIG. 7 is a process flow diagram depicting a Content Retrieval process.

Referring to FIG. 7, the content retrieval operation provides the result of the Routines, in the form of a content indicator 70, is used to lookup entries 71 in the Content Database 72. This database 72 can be resources in the local storage and/or remote servers. The returned content 73 can be a webpage and/or multimedia content to be displayed, or it can be data sequences to be used for further processing.

This system targets consumer electronic devices such as computers, smart phones, and tablet computers. Information content is retrieved by extracting data in an image that is captured by an image capture device such as a camera. The image can be printed matter or electronically displayed on a display device. To analyze the image content, an image capture device is used to convert the observed image to a digital image frame in the form of a data stream. The digital image frame is subsequently processed by the system to retrieve information content for display or use in the application. The system uses two routines which are: recognition of machine readable codes/shapes/characters; and decoding a steganographic signal. These two routines recognize image features and/or retrieve a hidden embedded image.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

I claim:

1. A method for retrieving associated information using an image, comprising:

locating a spatial pattern in an image captured by an image capture device, the spatial pattern providing an instruction or a specification for further processing to occur;

wherein if a first predetermined spatial pattern is located in the image, a steganographic signal is decoded from the image for extracting a profile configuration in order to retrieve the associated information; and if a second predetermined spatial pattern is located in the image, image features of the image are recognised in order to retrieve the associated information.

2. The method according to claim 1, further comprising an initial step of checking a flag to determine whether a steganographic signal is to be decoded from the image prior to locating the spatial pattern in the image.

3. The method according to claim 1, wherein if no spatial pattern is located in the image, a steganographic signal is to be decoded from the image for extracting a profile configuration in order to retrieve the associated information.

4. The method according to claim 1, wherein if a third predetermined spatial pattern is located in the image, at least a portion of the image is to be communicated to an analysis server with at least a portion of routine configuration parameters.

5. The method according to claim 4, wherein the routine configuration parameters include server information address of the analysis server, port of the analysis server, and protocol to communicate with the analysis server.

6. The method according to claim 5, wherein the routine configuration parameters further includes instructions on which analysis processes to be performed, and whether the analysis processes are performed in series or in parallel such that succeeding operations use the result of preceding operations.

7. The method according to claim 1, wherein the associated information is an Internet link or information content, and wherein the spatial pattern is any one from the group consisting of: pattern, Machine Readable Code, colour and character.

8. The method according to claim 1, wherein the image features are recognised using any one from the group consisting of: Optical Character Recognition (OCR) algorithms, Machine Readable Code and Feature Transform algorithms.

9. The method according to claim 1, wherein the extracted profile configuration causes a profile specific operation to be performed by accessing a profile database to retrieve the associated information for the extracted profile configuration.

10. The method according to claim 9, wherein the profile specific operation contains a profile indicator and parameters for the profile specific operation to generate a content indicator or actual content.

11. The method according to claim 9, wherein the profile specific operation is any one from the group consisting of: image recognition profile, and online processing profile.

12. A system for retrieving associated information using an image, comprising:

a pattern location module to locate a spatial pattern in an image captured by an image capture device, the spatial pattern providing an instruction or a specification for further processing to occur;

a steganographic signal decoding module to decode a steganographic signal from the image for extracting a profile configuration in order to retrieve the associated information if a first predetermined spatial pattern is located in the image; and an image feature recognition module to recognise image features of the image in order to retrieve the associated information if a second predetermined spatial pattern is located in the image.

13. The system according to claim 12, further comprising a communications module to communicate at least a portion of the image to an analysis server with at least a portion of routine configuration parameters, if a third predetermined spatial pattern is located in the image.

14. The system according to claim 13, wherein the routine configuration parameters include server information address of the analysis server, port of the analysis server, and protocol to communicate with the analysis server.

15. The system according to claim 14, wherein the routine configuration parameters further includes instructions on which analysis processes to be performed, and whether the analysis processes are performed in series or in parallel such that succeeding operations use the result of preceding operations.

16. The system according to claim 12, wherein the associated information is an Internet link or information content, wherein the spatial pattern is any one from the group consisting of: pattern, Machine Readable Code, colour and character.

17. The system according to claim 12, wherein the image features are recognised using any one from the group consisting of: Optical Character Recognition (OCR) module, Machine Readable Code and Feature Transform module.

18. The system according to claim 12, wherein the extracted profile configuration causes a profile specific operation to be performed by accessing a profile database to retrieve the associated information for the extracted profile configuration.

19. The system according to claim 18, wherein the profile specific operation contains a profile indicator and parameters for the profile specific operation to generate a content indicator or actual content.

20. The system according to claim 18, wherein the profile specific operation is any one from the group consisting of: image recognition profile, and online processing profile.

* * * * *